United States Patent
Vornehm

(10) Patent No.: US 11,111,995 B2
(45) Date of Patent: Sep. 7, 2021

(54) DRIVE UNIT FOR A HYBRID MOTOR VEHICLE; DRIVE TRAIN AS WELL AS METHOD FOR DRIVING THE DRIVE UNIT

(71) Applicant: Schaeffler Technologies AG & Co. KG, Herzogenaurach (DE)

(72) Inventor: Martin Vornehm, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/704,519

(22) Filed: Dec. 5, 2019

(65) Prior Publication Data
US 2020/0182343 A1    Jun. 11, 2020

(30) Foreign Application Priority Data
Dec. 7, 2018 (DE) .......................... 102018131286.5

(51) Int. Cl.
| | |
|---|---|
| *B60K 6/445* | (2007.10) |
| *B60K 6/365* | (2007.10) |
| *F16H 48/36* | (2012.01) |
| *B60K 6/26* | (2007.10) |

(52) U.S. Cl.
CPC ............ *F16H 48/36* (2013.01); *B60K 6/445* (2013.01); *B60K 2006/266* (2013.01); *F16H 2048/364* (2013.01)

(58) Field of Classification Search
CPC .. B60K 6/445; B60K 6/365; B60K 2006/266; F16H 48/36; F16H 2048/364; F16H 2048/368
See application file for complete search history.

(56) References Cited

U.S. PATENT DOCUMENTS

| | | | |
|---|---|---|---|
| 10,781,890 B2 * | 9/2020 | Lian | B60K 7/0007 |
| 10,836,427 B2 * | 11/2020 | Flaxman | B60K 6/48 |
| 2004/0220011 A1 * | 11/2004 | Gumpoltsberger | F16H 48/36 475/205 |
| 2019/0195328 A1 * | 6/2019 | Koyama | B60K 17/28 |
| 2020/0156621 A1 * | 5/2020 | Nakayama | B60K 6/365 |

FOREIGN PATENT DOCUMENTS

| | | | | |
|---|---|---|---|---|
| EP | 3271205 B1 | 5/2018 | | |
| WO | WO-2017107848 A1 * | 6/2017 | | B60K 6/387 |
| WO | WO-2017198356 A1 * | 11/2017 | | B60W 10/04 |

* cited by examiner

*Primary Examiner* — Tisha D Lewis
(74) *Attorney, Agent, or Firm* — LeKeisha M. Suggs

(57) ABSTRACT

A drive unit for a hybrid motor vehicle has an input shaft connectable to an internal combustion engine, a first output shaft connectable to a first wheel, a second output shaft connectable to a second wheel, and a distribution unit. The distribution unit is configured to generate different torques at the first and the second output shafts, the distribution unit acting between the input shaft and the output shafts. The distribution unit has a transmission device and first and second generators that are configured to be controlled independently of one another for torque distribution. The first generator is operatively connected to the first output shaft and the second generator is operatively connected to the second output shaft.

7 Claims, 1 Drawing Sheet

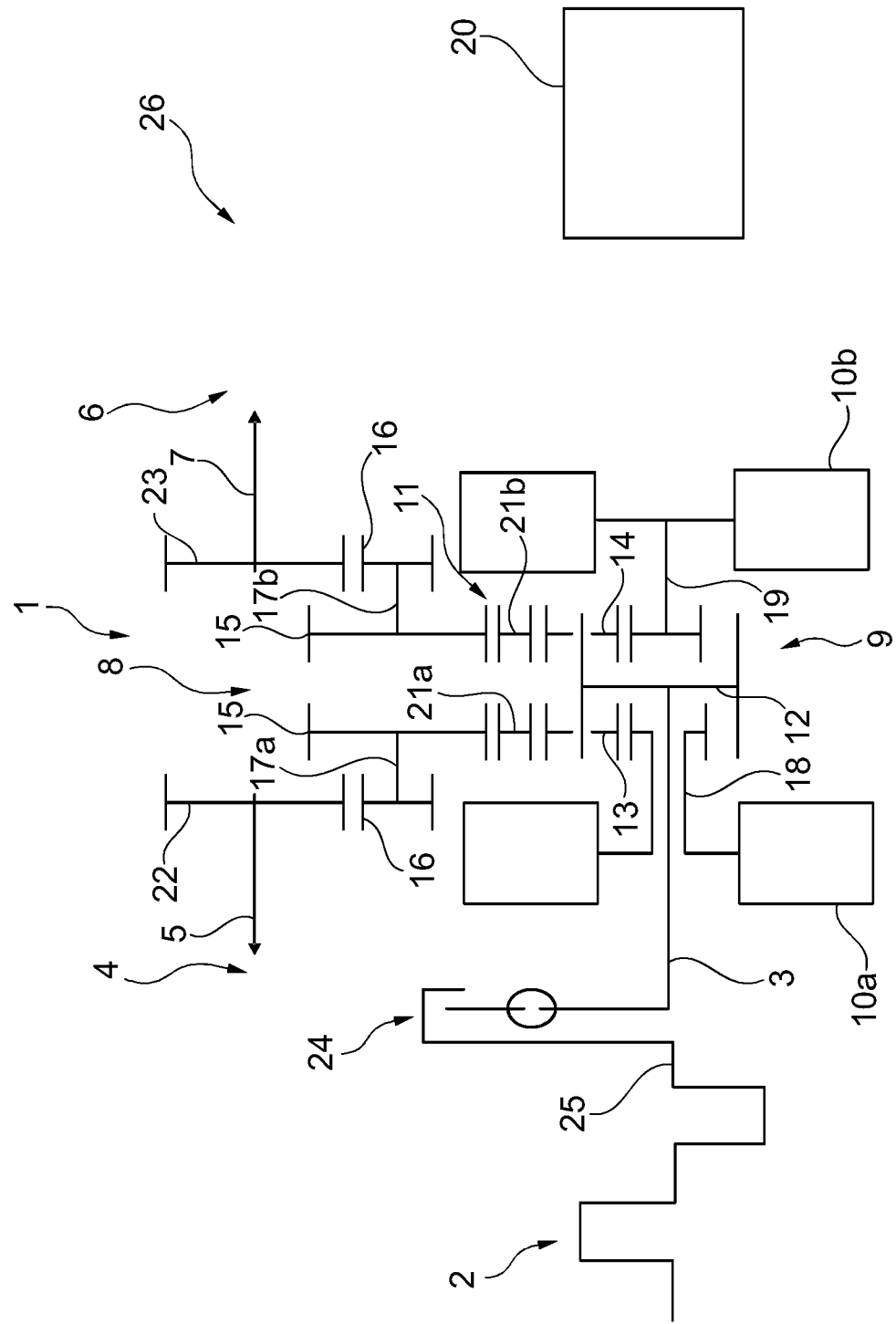

US 11,111,995 B2

DRIVE UNIT FOR A HYBRID MOTOR VEHICLE; DRIVE TRAIN AS WELL AS METHOD FOR DRIVING THE DRIVE UNIT

CROSS-REFERENCE TO RELATED APPLICATIONS

This application claims priority to DE 102018131286.5 filed Dec. 7, 2018, the disclosure of which is incorporated in its entirety by reference herein.

TECHNICAL FIELD

The disclosure relates to a (hybrid) drive unit for a hybrid motor vehicle, such as a passenger vehicle, a goods vehicle, a bus or some other utility vehicle, having an input shaft that is connectable to an internal combustion engine, a first output shaft that is connectable to a first wheel, a second output shaft that is connectable to a second wheel, as well as a distribution unit that is used operatively between the input shaft and the output shafts configured for producing mutually different torques on the output shafts. Furthermore, the disclosure relates to a drive train with said drive unit and a method for driving said drive unit.

BACKGROUND

The state of the art is disclosed, for example, by EP 3 271 205 B1. A compensating unit of a motor vehicle as well as a method for the control thereof are disclosed therein.

Nevertheless, as a disadvantage of the drive units that are known from the prior art, which comprise at least one electrical machine in conjunction with splitting of the driving torque over a number of driving wheels of the motor vehicle, it has been found that these are still relatively restricted with respect to their functionality. It is necessary as a rule to provide a number of couplings or couplings of relatively complex design, which occupy a relatively large amount of installation space.

SUMMARY

The object of the present disclosure is thus to address the disadvantages that are known from the prior art and, in particular, to make available a compact drive unit with the intention of increasing the functionality.

This is accomplished according to the disclosure, in that the distribution unit comprises a transmission device as well as two generators that are capable of being controlled independently of one another for torque distribution, wherein a first generator is operatively connected to the first output shaft and a second generator is operatively connected to the second output shaft.

The final drive (drive provided by the output shafts) and the number of generators present are purposefully duplicated, therefore, in order to achieve significantly smaller dimensioning. The drive unit is purposefully implemented as a differential gear in conjunction with two generators. This subdivision into two generators enables the individual generators to be selected so that they are significantly more compact in terms of their size and can be integrated more easily into existing installation spaces. Selective control of the two generators in this case produces a differential function (difference in rotational speed is permitted) as well as a torque vectoring function (difference in torque is purposefully controlled) in a simple manner. This increases the functionality significantly.

It is also advantageous, therefore, if the transmission device comprises a planetary gear, wherein a planetary gear carrier for the planetary gears is connected to the input shaft, a first planetary gear of the planetary gears that is rotatably supported on the planetary gear carrier is indirectly rotationally coupled to the first output shaft and a second planetary gear of the planetary gears that is rotatably supported on the planetary gear carrier is indirectly connected to the second output shaft. The compactness of the drive unit is further improved as a result.

In this context, it is expedient in addition if the first planetary gear is in rotational connection directly or indirectly with a first double gear wheel having two gear-meshing areas of different dimensions, and/or the second planetary gear is in rotational connection directly or indirectly with a second double gear wheel having two gear-meshing areas of different dimensions.

It is particularly advantageous in this respect if the first planetary gear is in rotational connection with a first gear-meshing area of the first double gear wheel via a (first) intermediate gear wheel meshing therewith. It is also advantageous, therefore, if the second planetary gear is in rotational connection with a first gear-meshing area of the second double gear wheel via a meshing (second) intermediate gear wheel meshing therewith.

It is likewise expedient in this respect, if a first output gear wheel that is connected to the first output shaft is in meshing engagement with a second gear-meshing area of the first double gear wheel, wherein said second gear-meshing area in respect of its dimensioning is dimensioned differently from the first gear-meshing area of the first output gear wheel. It is likewise expedient if a second output gear wheel that is connected to the second output shaft is in meshing engagement with a second gear-meshing area of the second double gear wheel, wherein said second gear-meshing area is dimensioned differently from the first gear-meshing area of the second output gear wheel. It is expedient, in particular, if the first gear-meshing area of the respective double gear wheel (with its pitch circle diameter) is of larger configuration than the second gear-meshing area of the same double gear wheel. An especially simply constructed as well as manufacturable drive unit is made available as a result.

It is also advantageous if the first generator comprises a first drive shaft that is rotationally coupled to the first planetary gear, and the second generator comprises a second drive shaft that is rotationally coupled to the second planetary gear. An especially direct linking of the generator to the transmission device is obtained as a result.

The manufacturing cost is further reduced if the two generators are implemented as identical components (e.g., identically dimensioned and configured with an identical rated output).

Furthermore, it is inherently advantageous to provide controllable, non-controllable or rotational speed-dependent coupling devices in or on the two output shafts, for example into the output shafts directly, into the intermediate gear wheels or into the double gear wheels, which may act by friction locking, by form locking or by fluid mechanics. The controllability is further simplified as a result.

Furthermore, the disclosure relates to a drive train for a motor vehicle per se, having a drive unit according to at least one of the previously described embodiments.

In this context it is additionally advantageous if an electrical machine supplied by at least one of the two generators or by both generators is present for driving at least one output shaft used on a rear axle. The drive unit in turn is then used operatively, for example, by a front axle, so that an effective all-wheel drive is achieved.

Furthermore, the disclosure relates to a method for driving the drive unit according to at least one of the previously described embodiments, wherein both generators are controlled in such a way that the generators, in the event of a difference existing in the rotational speed between the first output shaft and the second output shaft, generate purposefully different torques provided by the output shafts.

Controlling is further improved in respect of its efficiency if the generators are controlled in such a way that a certain difference in the torques is obtained for a certain steering wheel deflection of the motor vehicle.

It is furthermore advantageous if a driving power received by an electrical machine is thus equal to the partial outputs generated by the two generators or deviates by +/−10% from this sum, wherein a difference between the driving power of the sum of the partial outputs generated by the two generators is taken from a battery or is supplied to said battery.

In other words, a dedicated hybrid drive (DHT/Dedicated Hybrid Transmission) with torque vectoring (steering by torque distribution to the driving wheels) is thus realized according to the disclosure. According to the disclosure, two generators as well as two output shafts are used in this hybrid drive in order to produce torque vectoring and/or traction control by means of different generator wheel torques, which result in different wheel torques.

BRIEF DESCRIPTION OF THE DRAWINGS

The disclosure is now explained in more detail below based on the FIGURE.

The single FIGURE depicts a schematic view of a drive unit used in a drive train according to embodiments disclosed herein.

The FIGURE is of a schematic nature only and therefore serves the sole purpose of clarifying the disclosure.

DETAILED DESCRIPTION

The basic design of a hybrid drive unit 1 according to embodiments disclosed herein is shown in the FIGURE. The drive unit 1 is used operatively in a drive train 26 of a motor vehicle between an internal combustion engine 2 and two wheels 4, 6 (driving wheels of the motor vehicle), which are represented here only in their position for clarity purposes. The two wheels 4, 6 are assigned to a front axle of the drive train 26. The drive unit 1 is thus used in a front axle of the drive train 26 of the motor vehicle.

The internal combustion engine 2 in the operating state is rotationally coupled to an input shaft 3 of the drive unit 1, wherein in this embodiment a torsional vibration damper 24 is used between an output shaft 25 of the internal combustion engine 2 and the input shaft 3 of the drive unit 1. Furthermore, a distribution unit 8 configured according to the disclosure is used between the input shaft 3 and the output shafts 5, 7 of the drive unit 1 connected to the wheels 4, 6. Furthermore, an electrical machine 20, represented only schematically in the FIGURE is present in the drive train 26. This electrical machine 20 is positioned on a rear axle of the drive train 26 of the motor vehicle and is integrated into an electrical shaft drive unit in this embodiment. In operation, the electrical machine 20 thus exerts a driving effect on the rear wheels of the motor vehicle.

As can be seen in the FIGURE, the distribution unit 8 according to the disclosure is equipped with a transmission device 9. The transmission device 9 further comprises a planetary gear 11. The planetary gear 11 is connected with its planetary gear carrier 12 directly to the input shaft 3. A set (first planetary gear set) of first planetary gears 13 as well as a set (second planetary gear set) of second planetary gears 14 is arranged on the planetary gear carrier 12. The sets of planetary gears 13, 14 are preferably dimensioned identically in relation to one another and/or of identical embodiment. The first planetary gears 13 and the second planetary gears 14 are thus implemented in each case as mutually identical components.

The first planetary gear 13 is in meshing engagement with a first intermediate gear wheel 21a configured as a ring gear. The first intermediate gear wheel 21a in turn is in meshing engagement with a first gear-meshing area 15 of a first double gear wheel 17a. A second gear-meshing area 16 of the first double gear wheel 17a, which has smaller dimensions than the first gear-meshing area 15 in terms of its pitch circle diameter, is in meshing engagement with a first output gear wheel 22 connected directly to the first output shaft 5. The second planetary gear 14 is in meshing engagement with a second intermediate gear wheel 21b. The second intermediate gear wheel 21b constitutes a ring gear for the second planetary gear 14. The second intermediate gear wheel 21b is in meshing engagement with a first gear-meshing area 15 of a second double gear wheel 17b. The second double gear wheel 17b is in meshing engagement with a second output gear wheel 23 that is rotationally connected directly to the second output shaft 7 via a second gear-meshing area 16 of the second double gear wheel 17b, which is provided with a smaller pitch circle diameter in comparison with the first gear-meshing area 15 of the second double gear wheel 17b. It should be noted in this context that both the two intermediate gear wheels 21a, 21b are configured as mutually identical components, and the double gear wheels 17a, 17b are configured as mutually identical components, and the output gear wheels 22, 23 are also configured as mutually identical components.

Two generators 10a, 10b, which are likewise implemented as identical components and as such possess the same rated output, are present in addition to the planetary gear 11 configured as a duplicate/two-stage planetary gear 11. A first generator 10a comprises a first drive shaft 18 constituting a sun gear wheel, which is in meshing engagement directly with the first planetary gears 13. A second generator 10b comprises a second drive shaft 19 constituting a sun gear wheel, which is in meshing engagement with the second planetary gears 14. Whereas the first generator 10a is arranged on a first axial side of the planetary gear carrier 12, the second generator 10b is arranged on a second axial side of the planetary gear carrier 12 facing away from the first generator 10a.

The two generators 10a, 10b are used in such a way and are controlled in such a way in operation, furthermore, that they generate a purposeful difference in torque between the two output shafts 5, 7 in a corresponding operating mode and in so doing perform so-called torque vectoring. Furthermore, the generators 10a, 10b are basically designed in such a way and are controlled in a corresponding method for driving the drive unit 1 in such a way that they generate different torques provided by the output shafts 5, 7 in the event of a difference existing in the rotational speed between the first output shaft 5 and the second output shaft 7. Traction control is also achieved in this way. Furthermore, the generators 10a, 10b are controlled in such a way that a certain difference is generated in the torques (on the part of the output shafts 5, 7) at a certain steering wheel deflection of a steering wheel of the motor vehicle.

For the purpose of supplying the electrical machine 20, it has proven to be ingenious for a driving power received by the electrical machine 20 to be equal to a sum of the partial outputs generated by the two generators 10a, 10b or to deviate from this sum by +/−10%, wherein a difference between the driving power and the sum of the partial outputs generated by the two generators 10a, 10b is taken from a battery or is supplied to said battery.

It should be noted in principle at this point, furthermore, that coupling devices may also be provided in order to disconnect the output shafts 5, 7 separately from the distribution unit 8/the planetary gear 11.

In other words, a duplication of the final-drive 5, 7, the final drive ratio of the planetary gear set 13, 14, and the generator 10a, 10b (with significantly smaller dimensioning) is implemented according to the disclosure, so that a selective control produces a differential function (to permit a difference in rotational speed) and a torque vectoring function (to control a difference in torque). As a result, the bevel gear differential is omitted in comparison to previous embodiments, and the generators are made smaller. The planetary gear ratios can be adapted optionally, e.g. from i0=−1.4 to i0=−1.7. When driving round curves, slightly different rotational speeds of the generators 10a, 10b are now achieved (compulsorily). Identical wheel torques L and R occur at identical generator torques L and R, as in a differential (side L is the left-hand side of the drive train 26 according to the FIGURE, i.e., the side of the first wheel 4/the first generator 10a, and the side R is the right-hand side of the drive train 26 according to the FIGURE, i.e., the side of the second wheel 6/the second generator 10b). Controlling a difference in the generator wheel torques L and R produces different wheel torques L and R, so that torque vectoring or traction control is possible. A mechanical "differential lock" can be implemented in the form of a (form-fit or friction-fit) coupling between the output drives. The motor 20 of the electrical rear axle receives the two generator outputs. As a matter of principle, and depending on the speed, 30-100% of the ICE output reaches both front wheels 4, 6 (in total) mechanically, and the remaining 70-0% reaches the rear axle electrically. A parking lock is advantageously arranged in the electrical rear axle.

A duplicate final-drive toothing and a duplicate generator 10, 10b is thus present, with an at least partially selective effect of a generator 10a, 10b on one side of the wheel 4, 6. A planetary gear set 13, 14 is implemented in duplicate with a common component (carrier 12), which is connected to the combustion engine 2. The generators 10a, 10b are present on sun gear wheels 18, 19 and are equal in size. An electrical axle (electrical shaft drive unit) is integrated into the rear part of the vehicle. The electrical axle can be configured with reduction gearing, coaxially, axially parallel, etc. A controllable/non-controllable/rotational speed-dependent coupling device for both output drives (on the side shafts, or ring gears, or final drives) may also be implemented with a friction fit, a form fit or flow mechanics.

A method (HMI) for controlling the drive unit 1/the drive train 26 may be implemented by controlling both generators 10a, 10b in such a way that, in the event of a difference in rotational speed, a generator-torque difference is controlled. In an embodiment, when driving around curves, which involves an immediate difference in the rotational speed between the wheels 4, 6, the wheel on the outside of the curve, for example, receives more torque for stabilization. Controlling of both generators 10a, 10b may also be implemented in such a way that, for a steering wheel deflection, a generator-torque difference is controlled (i.e. in the event of the driver wishing to drive around curves, the steering effect is supported by the wheels 4, 6). Control of the electrical axle in this case takes place in such a way that the received electrical power is equal to the sum of the generated power of both generators 10a, 10b (+−10%) and the difference comes into/from a battery.

LIST OF REFERENCE CHARACTERS

1 drive unit
2 internal combustion engine
3 input shaft
4 first wheel
5 first output shaft
6 second wheel
7 second output shaft
8 distribution unit
9 transmission device
10a first generator
10b second generator
11 planetary gear
12 planetary gear carrier
13 first planetary gear
14 second planetary gear
15 first gear-meshing area
16 second gear-meshing area
17a first double gear wheel
17b second double gear wheel
18 first drive shaft
19 second drive shaft
20 electrical machine
21a first intermediate gear wheel
21b second intermediate gear wheel
22 first output gear wheel
23 second output gear wheel
24 torsional vibration damper
25 output shaft
26 drive train

What is claimed is:

1. A drive unit for a hybrid motor vehicle, comprising:
    an input shaft connectable to an internal combustion engine,
    a first output shaft connectable to a first wheel,
    a second output shaft connectable to a second wheel,
    a distribution unit configured to generate different torques at the first and the second output shafts, the distribution unit acting between the input shaft and the output shafts,
    wherein the distribution unit comprises a transmission device and first and second generators that are configured to be controlled independently of one another for torque distribution,
    wherein the first generator is operatively connected to the first output shaft and the second generator is operatively connected to the second output shaft,
    wherein the transmission device includes a planetary gear, and wherein:
        a planetary gear carrier for the planetary gear is connected to the input shaft,
        a first planetary gear of the planetary gear is rotatably supported on the planetary gear carrier and rotationally coupled indirectly to the first output shaft, and
        a second planetary gear of the planetary gear is rotatably supported on the planetary gear carrier and connected indirectly to the second output shaft, and
    wherein the first planetary gear is in rotational connection directly or indirectly with a first double gear wheel comprising two gear-meshing areas of different dimensions and/or the second planetary gear is in rotational connection directly or indirectly with a second double gear wheel comprising two gear-meshing areas of different dimensions.

2. The drive unit as claimed in claim 1, wherein the first generator comprises a first drive shaft that is rotationally coupled to the first planetary gear, and the second generator comprises a second drive shaft that is rotationally coupled to the second planetary gear.

3. The drive unit as claimed in claim 1, wherein the first and the second generators are implemented as identical components.

4. A drive train for a motor vehicle, having a drive unit as claimed in claim 1.

5. The drive train as claimed in claim 4, further comprising an electrical machine configured for driving at least one output shaft on a rear axle supplied by the first generator and/or the second generator.

6. A method for driving a drive unit of a hybrid motor vehicle having an input shaft connected to an engine, a first output shaft connected to a first wheel, a second output shaft connected to a second wheel, and a distribution unit acting between the input and the output shafts and including a first generator operatively connected to the first output shaft and a second generator operatively connected to the second output shaft, the method comprising:

generating via the first and the second generators different torques provided by the first and the second output shafts in response to a difference in rotational speed existing between the first output shaft and the second output shaft, wherein a driving power received by an electrical machine is equal to a sum of partial outputs generated by the first and the second generators or deviates by +/−10% from the sum, wherein a difference between the driving power and the sum of the partial outputs generated by the first and second generators is taken from a battery or is supplied to the battery.

7. The method as claimed in claim 6, wherein the first and the second generators are controlled in such a way that a difference in the torques is obtained for a predetermined steering wheel deflection of the motor vehicle.

* * * * *